Aug. 2, 1955
D. K. MARTIN
2,714,552
DIRECT CONDENSATE COOLER IN FLUE GAS GENERATOR
Filed April 12, 1951
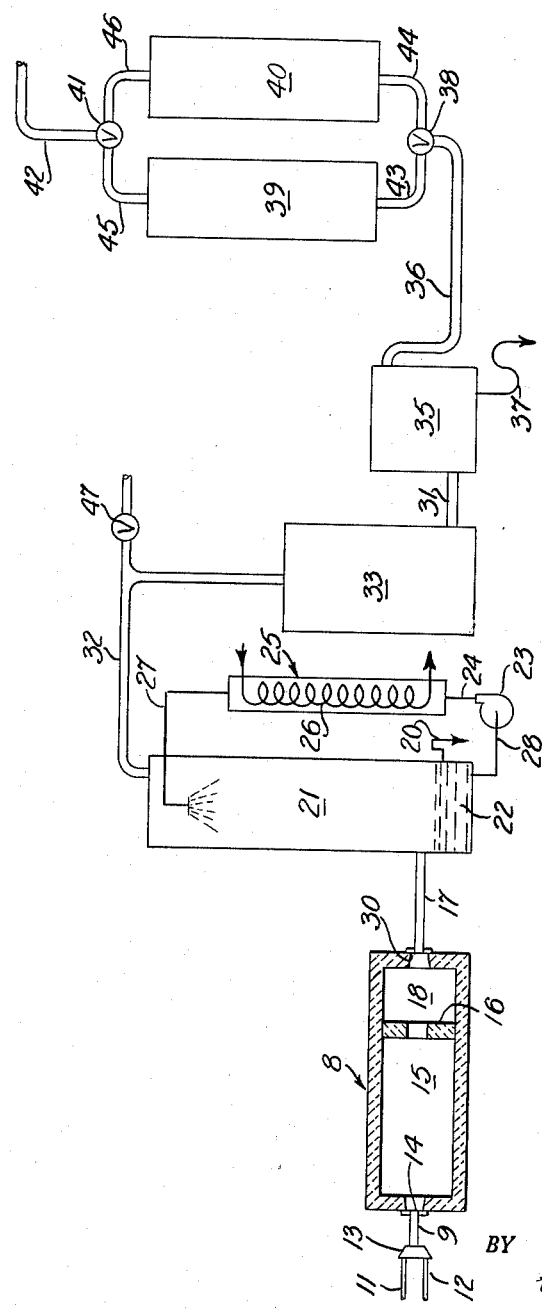
INVENTOR.
D. K. Martin
BY
Charles A. Lind
Attorney United States Patent Office 2,714,552
Patented Aug. 2, 1955

2,714,552

DIRECT CONDENSATE COOLER IN FLUE GAS GENERATOR

Donald K. Martin, Pittsburgh, Pa., assignor to Surface Combustion Corporation, Toledo, Ohio, a corporation of Ohio Application April 12, 1951, Serial No. 220,673

1 Claim. (Cl. 23—281)

This invention relates to a gas generator for generating an atmosphere gas suitable for metallurgical processes.

Combustion flue gas generators are well known in the art and comprise a combustion chamber, generally refractory lined, a burner for burning a stoichiometric or richer mixture of fuel and air in the combustion chamber and a cooler for cooling the products of that combustion to fix the gas constituents thereof and prevent reversion reactions as well as to condense from such products excessive moisture formed in the combustion process.

The cooling of combustion product gases has generally been either direct or indirect. Direct cooling is the result of contacting the hot gases with the coolant, usually fresh water or water cooled in an outdoor spray pond or the like. It is usually carried out in a spray tower or equivalent where water is flowed over an inert packing or contact surface and the gases are passed through the tower in direct contact with the water, but flowing counter-current thereto.

The direct cooler has the advantages of rapid cooling of the gas, automatic and easy removal of condensate and no detrimental effect upon critical parts due to heat from the gases because all parts are easily protected by flowing water. The direct cooler has the major disadvantage of carrying contaminating gases, especially oxygen, into the gas stream from the fresh or aerated cooling water available for such cooling purposes.

Indirect cooling of the hot products of combustion is the cooling of the gases by passing them in contact with an inert heat exchanger surface which is generally water cooled on the other side. The preferred apparatus for an indirect cooler for cooling hot gases is a finned tube heat exchanger over whose external fins the gases are passed and through the tube of which cooling fluid, generally fresh or aerated water, is passed.

The indirect cooler has the major advantage of avoiding the contamination which is inherently present in direct coolers, thus making possible use of the cooled gas for many processes where oxygen contamination cannot be tolerated. The indirect cooler has the major disadvantage of inefficient cooling between the hot gases and the cooling water, thus slow cooling, which allows reversion reactions to produce soot, tars and the like, and increase the $CO_2$ content of the gases, and it also requires special provisions for removal of accumulated condensate. There is no protection for exposed fins and heat exchange surfaces which first contact the hot gases, so these have exceedingly short life, and the local overheating by these hot gases causes deposits of lime on the water side of the heat exchanger which further shorten the useful life and decrease the efficiency of the indirect cooler.

The present invention presents a relatively simple solution to the major problems presented by the prior art coolers and obtains the benefits of the more desirable characteristics or advantages of both the direct and the indirect coolers.

For a consideration of what I consider to be novel and my invention, attention is directed to the following specification and the concluding claim thereof.

In the drawing the single figure is a schematic diagram of the apparatus according to this invention.

Fuel and air are delivered to a refractory lined combustion chamber 8 by way of fuel and air pipes 11 and 12, mixer 13, manifold 9 and burner 14. The air-gas mixture is burned in the chamber 8 in zones 15 and 18 divided by a baffle wall 16 provided to accelerate combustion. Hot products of combustion are discharged through discharge port 30 and pipe 17 to a direct cooler 21 wherein water is sprayed or flowed counter-current to the gas flow in a manner to cool the products entering by pipe 17. This cooling water condenses water from the products of combustion and collects in a sump 22 from which it is drawn through pipe 28 by a pump 23 and delivered through a pipe 24 to an indirect liquid to liquid heat exchanger 25, then through a pipe 27 and back into the direct cooler. Excess of condensate is overflowed to the waste through trap 20. As the volume of this recirculating water is being continuously increased by the volume of condensate from the combustion product gases cooled in the direct cooler 21, the recirculating water is soon 100% condensate. The liquid to liquid heat exchanger 25 is cooled by fresh water or aerated water from a spray pond passed through a water coil 26. Thus the highly efficient direct cooler is utilized to cool the gases, but by use of condensate which is externally cooled in a relatively efficient liquid to liquid heat exchanger. The maximum temperature to which the water coil 26 is subjected may be 170° F. whereas prior finned tube indirect gas-liquid heat exchangers were subjected to temperatures in excess of 1800° F.

Cooled and partially dehydrated combustion product gas, or flue gas, leaves the condensate cooler system by pipe 32 and may be delivered to use through valve 47 or may be further dried as may be desired. The gas from pipe 32 is preferably passed into a refrigerator 33, and then by a pipe 31 to a water or fog eliminator 35 from which water removed is passed to waste by a trap 37, and the gas is passed through pipe 36 to a valve 38 from which it is passed alternately through pipes 43 and 44 to chemical dehydraters, or alumina towers, 39 and 40. Water condensate removed through trap 37 will of course be cold from passing through the refrigerator, and it may be desirable to add this to the recirculating condensate in the condensate cooler 21. It is customary to use alumina towers in pairs, using one for drying, while the other is being reactivated, then reversing. Gas passing from the alumina tower 39 or 40 passes through pipe 45 or 46 to valve 41 and is then delivered to use through pipe 42.

By the use of the condensate cooler system described rather than the direct or indirect coolers of the prior art, I have provided a more efficient and compact cooler which, with its auxiliaries, costs less to install and to operate than the prior coolers, has reduced maintenance problems and costs and retains the most important feature of the prior indirect cooler in that there is no possibility of contamination by the coolant of the gases being cooled. In cases where condensable or water soluble impurities are produced by the burning of special fuels, such impurities are constantly removed by the condensate overflow, and they do not inhibit the cooling efficiency of the condensate cooler system.

Having described my invention, I claim:

In an apparatus for producing a non-oxidizing atmosphere suitable for use in metallurgical processes, in combination, a combustion chamber, means for introducing into said combustion chamber a fuel-air mixture to be burned therein, a direct-cooling chamber connected to receive hot flue gas generated in said combustion chamber, an outlet for the cooled gas from said cooling chamber, means for distributing a liquid in intimate contact with the flue gas in said cooling chamber and directing said liquid upon the surfaces contacted by the flue gas entering said cooling chamber, means for withdrawing the liquid accumulating in said cooling chamber, an indirect cooler, said liquid-distributing means, withdrawing means and cooler forming with said cooling chamber a closed circuit for the liquid, said circuit being sealed against entrance of air and extraneous liquid, and means for removing excess liquid introduced into said circuit by condensation from the flue gas, the cooling capacity of said indirect cooler being sufficient to cause moisture to be condensed from the flue gas.

References Cited in the file of this patent

UNITED STATES PATENTS

| | | |
|---|---|---|
| 2,085,584 | Haskell | June 29, 1937 |
| 2,218,281 | Ridder et al. | Oct. 15, 1940 |
| 2,278,204 | Lewis | Mar. 31, 1942 |
| 2,314,827 | Hortvet | Mar. 23, 1943 |
| 2,333,193 | Persson et al. | Nov. 2, 1943 |
| 2,343,185 | Holm et al. | Feb. 29, 1944 |
| 2,418,162 | Cecil et al. | Apr. 1, 1947 |
| 2,598,116 | Du Bois | May 27, 1952 |